UNITED STATES PATENT OFFICE.

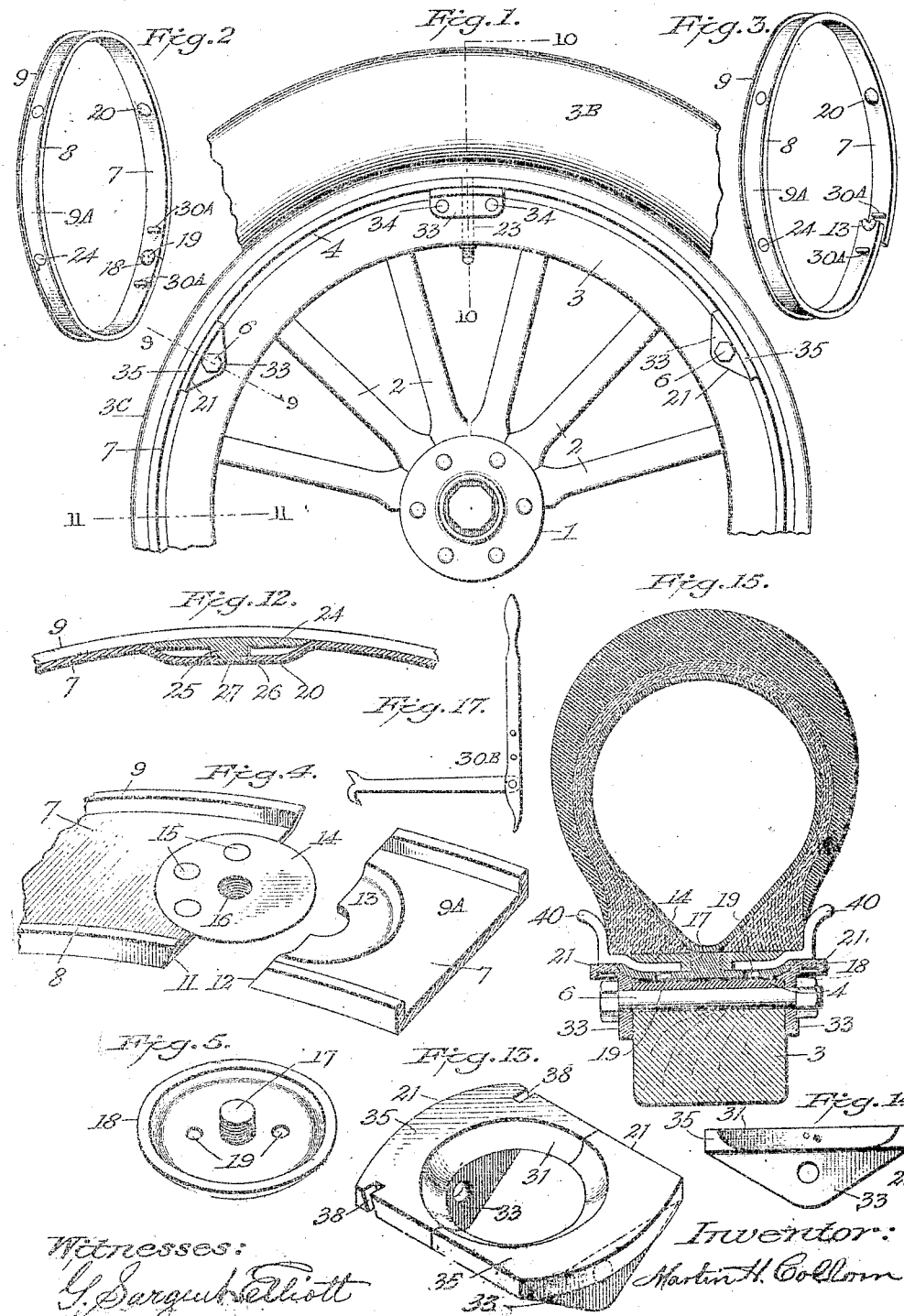

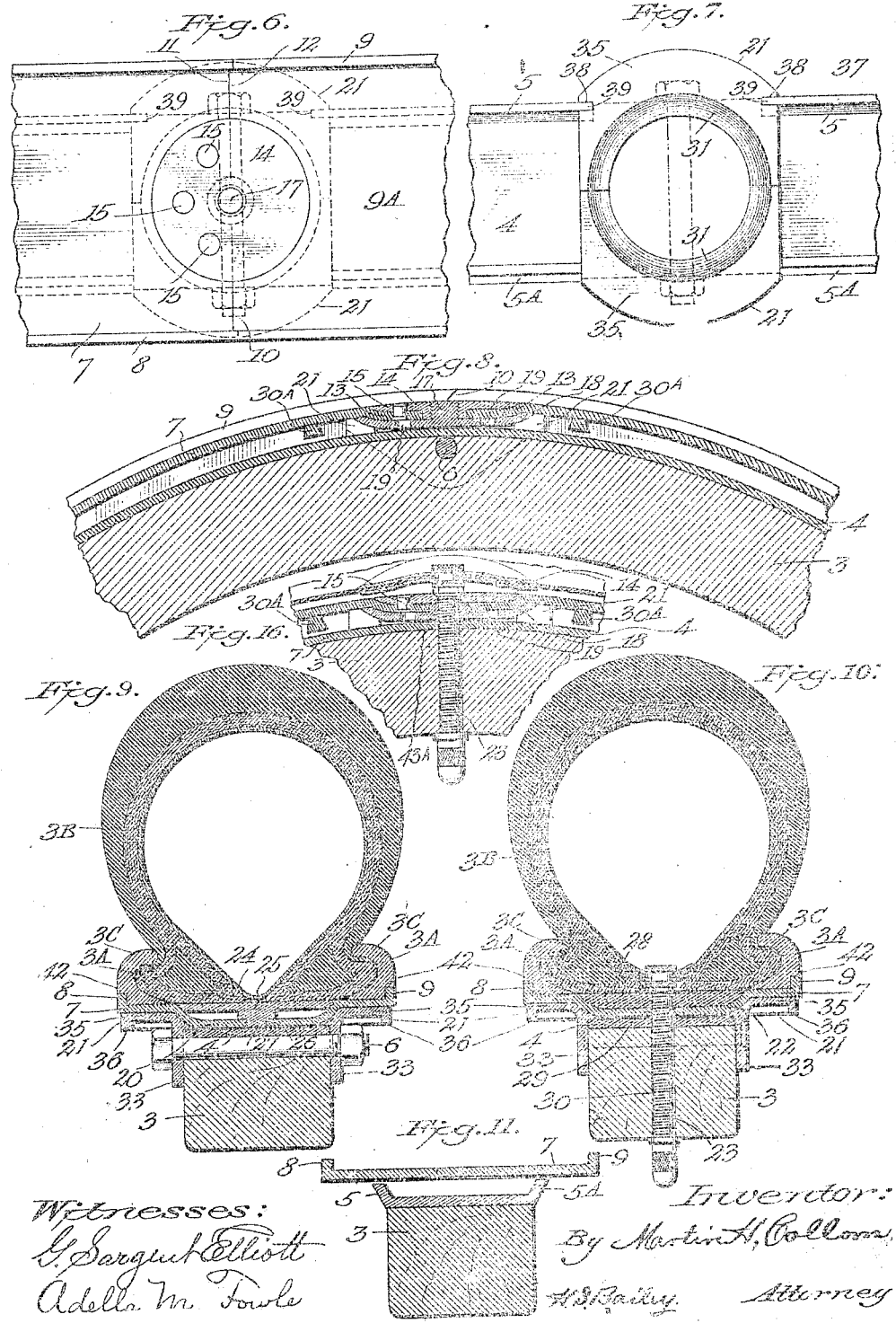

MARTIN H. COLLOM, OF DENVER, COLORADO, ASSIGNOR TO THE COLLOM DEMOUNTABLE RIM MANUFACTURING COMPANY, OF DENVER, COLORADO, A CORPORATION OF COLORADO.

DEMOUNTABLE TIRE-RIM FOR VEHICLE-WHEELS.

1,071,206.   Specification of Letters Patent.   Patented Aug. 26, 1913.

Application filed April 29, 1912.   Serial No. 693,966.

*To all whom it may concern:*

Be it known that I, MARTIN H. COLLOM, a citizen of the United States of America, residing in the city and county of Denver and State of Colorado, have invented a new and useful Demountable Tire-Rim for Vehicle-Wheels, of which the following is a specification.

My invention relates to improvements in demountable tire rims for wheels of automobiles and other vehicles; and the objects of my invention are: First, to provide a rim upon which a flexible tire can be easily mounted ready to be placed around and be securely attached to the vehicle wheel. Second, to provide a felly band for the vehicle wheel on which the tire rim can be firmly secured. And third, to provide a rim which can be easily demounted from the vehicle wheel, and also can be easily detached from the flexible tire.

I attain these objects by the mechanism illustrated in the accompanying drawings, in which:

Figure 1, is a side view of a portion of an automobile wheel, equipped with my improved demountable rim. Fig. 2, is a perspective view on a smaller scale of the improved rim detached from the wheel, the ends of the rim being locked together. Fig. 3, is a similar view, the rim being collapsed. Fig. 4, is an enlarged, fragmental view, showing the abutting ends of the rim separated. Fig. 5, is a perspective view of the locking cup which unites and holds the abutting ends of the rim together. Fig. 6, is a fragmental plan view showing the ends of the rim in locked engagement. Fig. 7, is a plan view of a portion of the felly band, showing a pair of the socket plates in position thereon, which receive the concavo-convex or cupped portions of the rim. Fig. 8, is a vertical, longitudinal sectional view, showing a portion of the wheel felly, with the wheel band and rim thereon, and showing the manner of locking the abutting ends of the said rim. Fig. 9, is a transverse sectional view on the line 9—9 of Fig. 1. Fig. 10, is a similar view on the line 10—10 of Fig. 1. Fig. 11, is a transverse sectional view on the line 11—11 of Fig. 1, showing the appearance of the felly band and rim in cross section, at points anywhere between the pairs of socket plates.
Fig. 12, is a vertical, longitudinal sectional view through a portion of the rim, showing one of the concavo-convex members which rest in the locking plates, and also the disk-shaped nut secured in the concave face of this member, which lies flush with the face of the rim. Fig. 13, is a perspective view of a pair of the locking plates. Fig. 14, is a front view of one of the locking plates. Fig. 15, is a transverse vertical sectional view of the wheel at the point where the ends of the rim abut, showing the locking plate in position, the clencher rings being omitted, and the rim being adapted for the reception of straight sided tires. Fig. 16, is a fragmental sectional view illustrating a modification, in which the air inlet tube is threaded and is passed through the rim where its ends abut, and through the felly, and the concavo-convex cap is provided with a threaded aperture, and is screwed upon the air tube to clamp the ends of the rim, as shown. And Fig. 17, is a front view of the tool used in expanding or contracting the tire holding rim.

Similar letters of reference refer to similar parts throughout the several views.

Referring to the drawings,—the numeral 1 designates the hub portion, 2 the spokes, and 3 the felly portion of an automobile wheel, and this wheel may be of any suitable type and may be made of any suitable material.

In the present state of the art detachable tires are in use in which the supporting or clencher beads $3^A$ of the pneumatic tire $2^B$ become through tire heating stuck to the metal clencher rings $3^C$. These metal clencher rings $3^C$ also become rusted on their supporting rim, making the taking off of the tire a difficult matter.

In my invention, the metal clencher rings can be cemented to the supporting or clencher beads of the tire, leaving them on as long as the tire is fit for use. When the tire is deflated, the flanged rim can easily be removed from the inner face of the tire by removing the threaded concave locking cap and collapsing the rim to a less diameter.

I do not limit my invention to the clencher bead type of pneumatic tire, as the flanged rim can be expanded and locked on the inner face of other pneumatic or solid types of tires.

A further function of the clencher rings 3ᶜ is to prevent the rupture of rim 7, at its joint or elsewhere, by centrifugal force when the wheel is rotating at a high speed.

Upon the felly 3, a metal band 4 is shrunk, which is provided with outwardly and upwardly projecting flanges 5 and 5ᴬ, at its opposite side edges, as shown in Fig. 11. These flanges however are cut away above the locking bolts 6, and this band at and adjacent to these bolts is a straight flat band, as shown in the section in Figs. 9 and 10. Upon the flanges of this felly band, I mount loosely a tire supporting rim 7. This rim 7 comprises a flat metal rim, that is provided at its opposite edges with raised flanges 8 and 9, both of which extend circumferentially around it, and a flat channel portion 9ᴬ is formed between the flanges 8 and 9. This rim is a circular channeled rim that may be divided transversely into one or two or more pieces, as desired. I preferably illustrate it divided transversely at only one point in its circumference by a cut 10. This cut 10, is preferably an oblique cut to the radial diameter of the rim, and is preferably made at an angle that permits the meeting ends 11 and 12 to slightly overlap each other. At this divisional transverse cut, the rim is provided with a circular concavo-convex cup 13, one-half of which (see Fig. 4) is formed in each meeting edge of the rim, and in one side of this cup a disk-shaped nut 14, is secured, the upper surface of which is even with and is concentric with the curve of the peripheral surface of the rim. This disk is preferably secured to the one half part of the cup that is in one end of the rim, by rivets 15, and this disk is preferably riveted to the half cup portion of the beveled end that laps over onto the beveled edge of the other end of the rim. This disk 14 projects over into the half part concavo-convex cup that is formed in the opposite end of the rim, and fits snugly into it when the meeting ends of the rim are close together, and through the axial center of this disk-shaped nut a threaded aperture 16 is formed, which is adapted to receive a threaded stud portion 17, that is formed on the inside of a concavo-convex cap 18 (see Fig. 5), which I term the locking cap, and which is adapted to fit over the two divided halves of the cup 13 (see Figs. 8 and 15). This cap is screwed into the threaded aperture in the disk-shaped nut, and onto the two half parts of the divided cup, and locks the two halves of this concavo-convex cup and also the two ends of the rim rigidly together, in a true circle (see Figs. 2, 15 and 8). This locking cap is provided with apertures 19, which are adapted to receive the ends of any suitable spanner wrench to assist in turning the cap and screwing it up tightly on the cup. The rim is also provided with a plurality of similar concavo-convex cups 20, throughout its circumference, and they are spaced preferably at equal distances apart, and they are also preferably positioned in the center of the width of the channel portion of the rim. They are preferably pressed or stamped in the periphery of the circumferential surface of the rim, although if desired they may be rolled or otherwise formed in the rim, or may be made independently of it and be secured to the rim by any suitable means. Each of these concavo-convex cups forms a depending locking lug that is employed coöperatively with locking plates 21, and the locking bolts 6, to lock the rim rigidly to the felly band and felly, and they are arranged and adapted to rest on the peripheral surface of the felly band loosely when the rim is locked together and is mounted on it. Each of these concavo-convex locking cups is filled up flush and even with the peripheral surface of the channel surface of the rim, in order that the inner peripheral surface of the tire may have an evenly curved and solid bearing surface on the entire circumferential surface of the rim, and while there are a number of ways in which these concaved recesses of these cups may be filled up, I preferably carry out this feature of my invention in the following manner: In each one of these concavo-convex cups 20 I place and fit a flat disk shaped metal plate 24, on the under side of which an axial lug portion 25, is formed, that rests against the central portion of the bottom of each cup, through the center of which an aperture 26 is formed, through which a riveting terminal end portion 27 of the lug 25 projects, and is securely riveted therein and to the aperture in the cup, which is countersunk on the outside to receive it (see Figs. 9 and 12). The outer surfaces of these disks are made even and concentric with the peripheral surface of the channel portion of the rim. The cup 22, through which the air inlet tube 23 is extended, instead of being provided with a metal plate disk, is provided with a flexible washer 28, of rubber or leather or other suitable material. I preferably, however, use a rubber washer, which preferably fits tight enough on the air inlet tube to be lifted out of the cup when the rim is collapsed and lifted off from the tire. This rubber washer 28 is also made to fit and fill the cup flush with the peripheral surface of the rim. The bottom of this cup 22 is also provided with an aperture 29, through which the air inlet tube extends loosely, and an aperture 30 is extended down through the felly band and the felly, through and beyond which the air inlet tube 23 projects loosely in a manner common to automobile wheels having pneumatic tires, as shown in Fig. 10. The inner peripheral surface of the rim adjacent to its ends and to its locking cup and threaded cap 18, is provided at a short distance from each end of the rim with a pair of depending lugs 30$^A$, which preferably are of dove-tailed form and are placed and used to collapse and also to spread the ends of the rim by means of any suitable spanner wrench, when demounting and detaching it from the felly and the tire, as will be fully described hereinafter.

In Fig. 17, I illustrate a spanner wrench 30$^B$ especially adapted for this purpose. This wrench and the manner of its application however, does not form a part of the present invention, and a further description of the same is deemed unnecessary.

The rim 7 is locked to the felly of the wheel by pairs of plates 21, which I term locking plates, which project from the opposite sides of the outside of the felly transversely across the felly band under the rim and around each of the concavo-convex cups 18, 20 and 22. The inner end portions of these locking plates are provided with a semi-circular recess 31. The upper edge of this semi-circular recess is curved and chamfered to fit the curvature of the convex surface of the cups. These locking plates extend under the rim from opposite sides of the felly, and their inner ends terminate at the center of the width of the felly band, and their inner ends substantially engage each other when they are fitting tightly up against and around the convex surface of the cups, and consequently they practically abut against each other, and they resist the pressure of the cups of the rim against them. The outer ends of each of these locking plates are provided with depending right angled lug portions 33, that are arranged to rest against the adjacent side of the felly, and the locking bolts 6 extend loosely through them and through the felly and bolt each pair of these locking plates rigidly around and in direct contact with the convex surface of the pressed depending cups of the rim, which locks them and the rim rigidly to the felly band, and the felly of the wheel. This is true of all of the locking plates except the pair at the air inlet tube hole, which are preferably secured by rivets 34 or by other suitable means, permanently to the felly. Each of these locking plates is provided at its outer ends with outwardly projecting lug portions 35, which are arranged to extend and fit up under the rim, and on the under side of the outer edge of this lug a depending lip 36 is formed, which is arranged and adapted to form a holding abutment for any suitable lever to pry the locking plates loose from the cups after the nuts of the bolts are removed, in case they should stick and bind to the cups and rim and felly band. The locking plates that are on the inner side 37 of the wheel, are preferably provided with outwardly inclined slots 38, on the opposite sides of their outer edge, which are positioned to fit down loosely over the adjacent ends 39 of the side flanges 5 of the felly bands, as shown in Figs. 6 and 7. These side flanges of the felly band are as before stated, cut away at the points of the felly band where these locking plates are positioned. These ends 39 are arranged to project into the slots 38. This arrangement secures the inner locking plates against accidental displacement from the felly when the nut is removed from its locking bolts. I preferably illustrate a section of an automobile wheel showing three of these locking plates and implying that six would preferably be used in the whole wheel, but more or less however, can be used as desired.

The rim 7 of my improved demountable tire apparatus is adapted to receive and support either pneumatic or solid tires. I have, however, preferably illustrated it provided with a pneumatic tire 3$^B$, of the clencher type, in Figs. 9 and 10, and with a straight side tire, in Fig. 15. The side rings 3$^C$ are of the commonly used type and are provided, as illustrated, with a rabbeted step 42, that permits them to fit over the top edge of the side flange lugs of the rim, and they are provided with a wide firm bearing surface on the channel surface of the rim. In Fig. 15, the flanges 40 of the rim are extended upwardly far enough to support this straight sided form of tire, and at their terminal edges are flared outwardly.

In Fig. 6, I illustrate a slight modification of my locking device of the divided split rim, in which the air inlet tube is extended through the locking device of the meeting ends of the collapsible rim. To accomplish this I provide the projecting stem of the cap with an axial aperture 43$^A$, the interior surface of which is threaded, and still leave in the cup the disk-shaped washer through which the metal air inlet tube of the inner tube of the pneumatic tire projects, and this metal air inlet tube is exteriorly threaded and the concavo-convex locking cap threads over and onto it and draws the divided parts of the concavo-convex cup and the meeting ends of the rim together as the locking nut on the metal air inlet tube is drawn down and rests against the top of the disk-shaped washer in the split cup.

The operation of my demountable tire supporting rim is as follows: For illustration, I take a pneumatic clencher tire and then: First, place the metal rings loosely or cement them onto the clencher beads of the tire. Put the round rubber washer on the valve stem of an inner tube, and place the tube in the tire. Take my flanged rim in its collapsed state, as shown in Fig. 3, and place it within the circle of the tire and metal rings, with the valve stem of the tube passing through the hole in the center of one of the concavo-convex cups of the rim adapted to receive it. Then expand my flanged rim with suitable tool to form a true round circular rim as shown in Fig. 2, against the inner periphery of the tire and metal rings. Then lock the meeting ends of the rim together by screwing on the locking cap over the concavo-convex cup at the meeting end of the rim, thus holding the rim firmly and securely in this inner and side supporting position in the tire and rings. The tire is now firmly secured to the rim and is ready to be inflated with air pressure. Second, to place the inflated tire and supporting rim on the vehicle wheel, turn the wheel in a position with the valve stem hole on top. Then put the valve stem in said hole and swing lower part of the tire rim on against the fixed or permanent halves of the locking plates of the felly band. Then place the loose halves of the locking plates over the felly bolts and around the cups of the rim between the rim and felly band. Then screw the nuts on the bolts and against the locking plates and force them tightly around the depending cups of the rim, thus securing the rim rigidly to the felly.

To demount the rim and its tire, remove the nuts from the locking bolts and then the locking plates and then turn the wheel until the air tube is uppermost; pull the lower portion of the rim and the tire from the felly; then raise the upper portion of the rim and the air tube out of the felly. Then to detach the deflated tire from the rim, first unscrew and remove the locking cap from the concavo-convex divided cup at the joint of the meeting ends of the rim; then insert any suitable spanner wrench between the depending lugs on opposite sides of the joint, and spring the ends apart and one below the other, which allows the rim to collapse smaller in diameter, as shown in Fig. 3, and moves it away from the tire and its metal side rings, and the rim can then be lifted out from within the inner periphery of the tire and its metal side rings.

The operation of mounting a flat sided tire on the rim is substantially the same as for a clencher tire.

The essential features of my invention consist in the transverse cut joint or joints in the tire rim held rigidly to resist the collapsing pressure of air in the inflated tire by the divided concavo-convex cup in the meeting ends of the rim, and the round threaded apertured disk secured in one half part side of said divided cup and the concavo-convex threaded locking cap fitting over the divided parts of this divided cup and the screwing into the threaded aperture of the disk; also the recessed and concaved form locking plates that extend across the felly band underneath the rim, and surround the depending concavo-convex cups of the rim, which are rigidly bolted to the felly, which owing to their even and rigid bearing against the full circular surface of the depending concavo-convex cups of the rim, do not distort the round diameter of the rim from a true circle when the rim is rigidly secured to the periphery of the felly band. These concavo-convex cups serve three distinct purposes as follows: First, to provide a means for locking the meeting ends of the rim together; second, to provide means for locking the rim to the felly band; third, to provide a recess for a flexible water resisting washer through which the air inlet tube projects.

My invention is simple in construction and provides a quickly demountable rim from both the felly and the tire, and while I have illustrated and described the preferred construction and arrangement of my invention, I do not wish to be limited to it, as changes might be made in its construction without departing from the spirit of my invention.

Having described my invention, what I claim as new and desire to secure by Letters Patent, is:

1. A demountable tire supporting rim, comprising a collapsible rim divided transversely by a cut and provided with meeting ends at said cut, and means including a two part concavo-convex cup depending from the inner peripheral surface of said rim at its meeting ends, a concavo-convex cap fitting over said two part cup and arranged to lock said parts of said cup and the meeting ends of said collapsible rim together.

2. A demountable tire supporting rim for the purpose specified, comprising a rim arranged to collapse to a smaller diameter, and having meeting ends arranged to form a circle when in alinement together, and means including a depending concavo-convex cup and a cap for locking the meeting ends of said rim together.

3. A demountable tire rim for the fellies of automobile and other wheels, comprising a rim, a plurality of depending concavo-convex cups spaced apart around the inner periphery of said rim, and means including locking plates bolted to the opposite sides of said felly and arranged and adapted to inclose and be clamped around and against said cups whereby said rim is demountably secured to said felly.

4. In a demountable tire supporting rim for the fellies of automobiles and other vehicles, the combination with the metal air inlet tube of a pneumatic tire, said air inlet tube being exteriorly threaded, of a transversely slit rim, a round concavo-convex cup having two portions one in each meeting end of the rim, a disk shaped washer in said cup, said disk shaped washer and said parts of said cup being provided with an axial aperture through which said air inlet tube is adapted to extend, and a concavo-convex cap fitting over the outside portions of said divided cup and provided with a threaded aperture portion arranged and adapted to threadedly fit and screw onto said metal air inlet tube, and to fit over said concavo-convex cup when the meeting ends of said rim are together, said threaded cap and said threaded air inlet tube being arranged and adapted to draw the parts of said cup and the meeting ends of said transversely split rim together and to clamp them together.

5. In a demountable rim as specified, the combination with the felly having bolts spaced around it at predetermined distances apart, and extending transversely through it, clamping and locking plates mounted on each of said bolts on the opposite sides of said felly, and arranged to extend transversely across the felly, said locking plates being each provided with a semi-circular concaved recess in its outer surface surrounding its semi-circular recess and arranged to register with the concaved recess of its opposing locking plate, with the tire supporting rim arranged to surround said felly and provided with a plurality of spaced depending concavo-convex cups arranged and adapted to fit into the concaved and semi-circular recesses of the locking plates of said felly.

6. A tire rim as specified, split transversely across its surface, through a concavo-convex cup formed in the surface of said rim, a cap adapted to fit over the inner surface of said concavo-convex split cup, and a threaded stud integral with said cap adapted to be screwed into a disk-shaped nut fitted in the concavo-convex cupped outer surface of said rim.

7. In a demountable tire rim, the combination of a tire supporting rim split transversely through its surface and through one of a plurality of concavo-convex cups arranged on the surface of said rim, a cap adapted to fit over the inner surface of said concavo-convex split cup, a threaded stud integral with the cap, adapted to be screwed into a disk-shaped nut fitted in the concavo-convex cup, in the outer surface of the rim, side flanges on said rim, and a pair of rings mounted upon said rim and arranged to abut laterally against the side flanges of said rim, said rings being formed on their inner sides and adapted to engage the clencher beads of a pneumatic tire.

8. The combination in a demountable tire supporting rim for automobiles and other vehicles, with the pneumatic tire and the felly, of an operative collapsible rim provided with meeting ends and arranged to collapse to a smaller diameter than when in its inflated tire supporting form, and arranged to receive and support operatively a pneumatic tire, means including a concavo-convex cup provided with a disk nut and a cap arranged and adapted to be threaded to said disk nut to clamp said meeting ends together to resist the collapsible pressure in said pneumatic tire, and means of operatively securing said rim to said felly.

9. A demountable tire rim for the fellies of vehicle wheels comprising a plurality of convex projections formed on the surface of said rim, and means including locking plates adapted to be bolted to the opposite sides of the felly, said plates having sockets for receiving said projections.

10. A demountable tire rim for the fellies of vehicle wheels comprising a plurality of convex projections formed on the surface of said rim, and means including locking plates adapted to be bolted to the opposite sides of the felly, said plates having sockets for receiving said projections, said locking plate comprising two portions, one secured to the rim, and the other removable therefrom.

11. A demountable tire rim for the fellies of vehicle wheels, comprising a severed collapsible rim portion having registering semi-circular depressions at the ends of the rim, a member fitting in the tire-side of said depression, means coöperating with said member to unite said ends, and integral means surrounding and coöperating with said rim preventing its rupture by centrifugal force.

In testimony whereof I affix my signature in presence of two witnesses.

MARTIN H. COLLOM.

Witnesses:
G. SARGENT ELLIOTT,
ADELLA M. FOWLE.